W. R. McKEEN, Jr.
CAR FRAME.
APPLICATION FILED SEPT. 11, 1905.

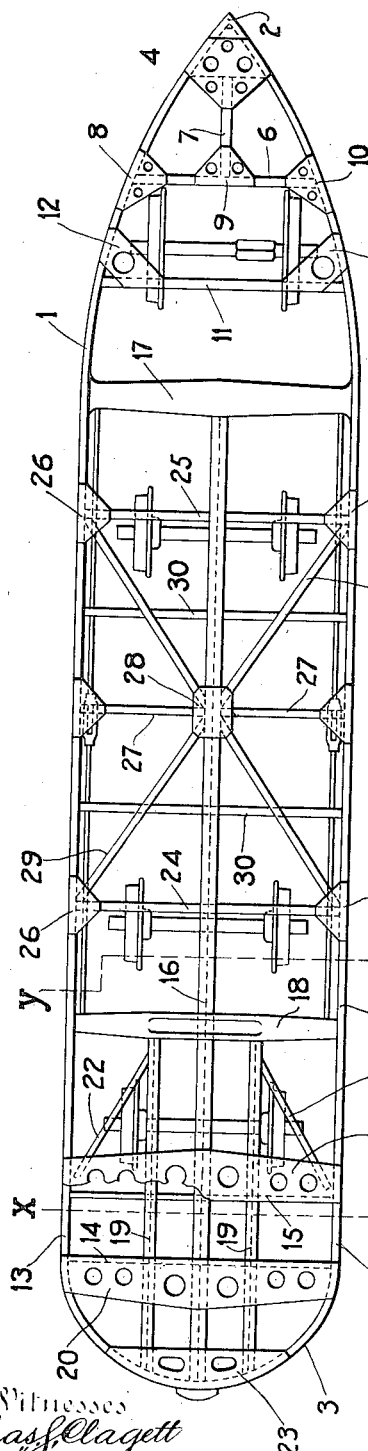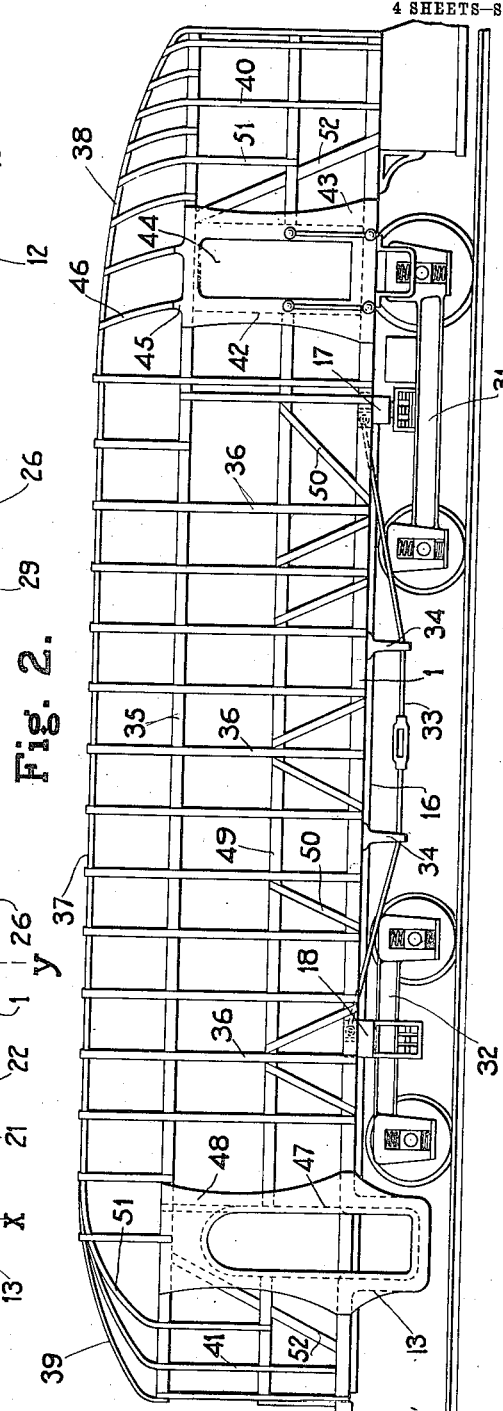

972,467.

Patented Oct. 11, 1910.
4 SHEETS—SHEET 2.

W. R. McKEEN, Jr.
CAR FRAME.
APPLICATION FILED SEPT. 11, 1905.

972,467.

Patented Oct. 11, 1910.
4 SHEETS—SHEET 3.

WITNESSES:

INVENTOR.
BY
ATTORNEYS

W. R. McKEEN, Jr.
CAR FRAME.
APPLICATION FILED SEPT. 11, 1905.

972,467.

Patented Oct. 11, 1910.
4 SHEETS—SHEET 4.

WITNESSES:

INVENTOR
W. R. McKeen Jr.
BY
ATTORNEYS

UNITED STATES PATENT OFFICE.

WILLIAM R. McKEEN, JR., OF OMAHA, NEBRASKA, ASSIGNOR, BY MESNE ASSIGNMENTS, TO McKEEN MOTOR CAR COMPANY, OF OMAHA, NEBRASKA, A CORPORATION OF NEW JERSEY.

CAR-FRAME.

972,467.            Specification of Letters Patent.      Patented Oct. 11, 1910.

Application filed September 11, 1905. Serial No. 277,912.

*To all whom it may concern:*

Be it known that I, WILLIAM R. McKEEN, Jr., residing at Omaha, in the county of Douglas and State of Nebraska, have invented certain new and useful Improvements in Car-Frames, of which the following is a full, clear, and exact description, such as will enable others skilled in the art to which it appertains to make and use the same.

This invention relates to car construction. One of the objects thereof is to provide a trussed framework for use in cars, which will be simple and light of construction and yet possess a maximum of strength and rigidity in use.

Another object is to provide a frame of the above type in which the resistance of the air to the movement of the car is reduced to a minimum.

Another object is to provide efficient means for increasing tractive power without increasing weight.

Another object is to provide a rigid, unitary framework adapted to preserve its original shape in the face of all stresses brought to bear thereon in the course of hard, practical use.

Other objects will be in part obvious and in part pointed out hereinafter.

The invention accordingly consists in the features of construction, combinations of elements, and arrangement of parts which will be exemplified in the structure hereinafter described, and the scope of the application of which will be indicated in the following claims.

Figure 4:
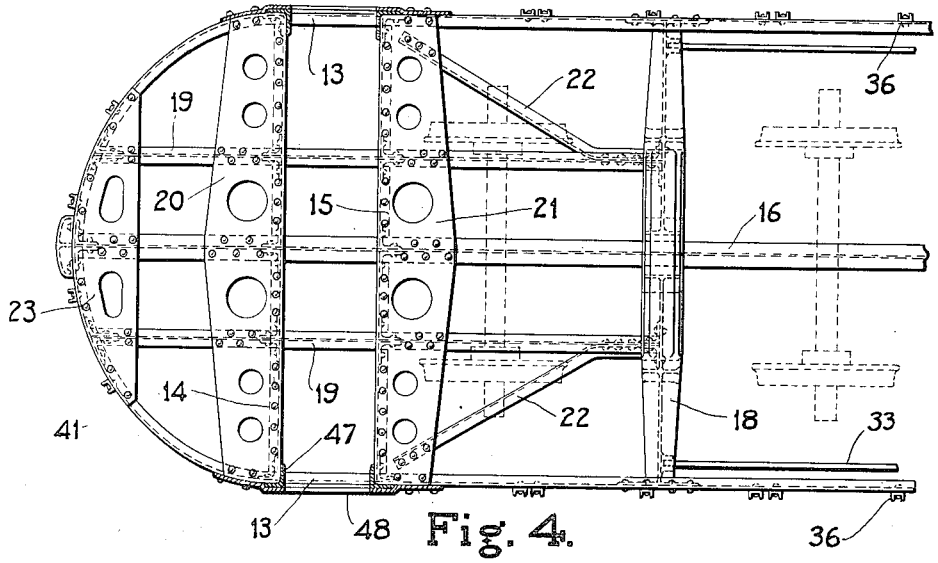
Figure 3:
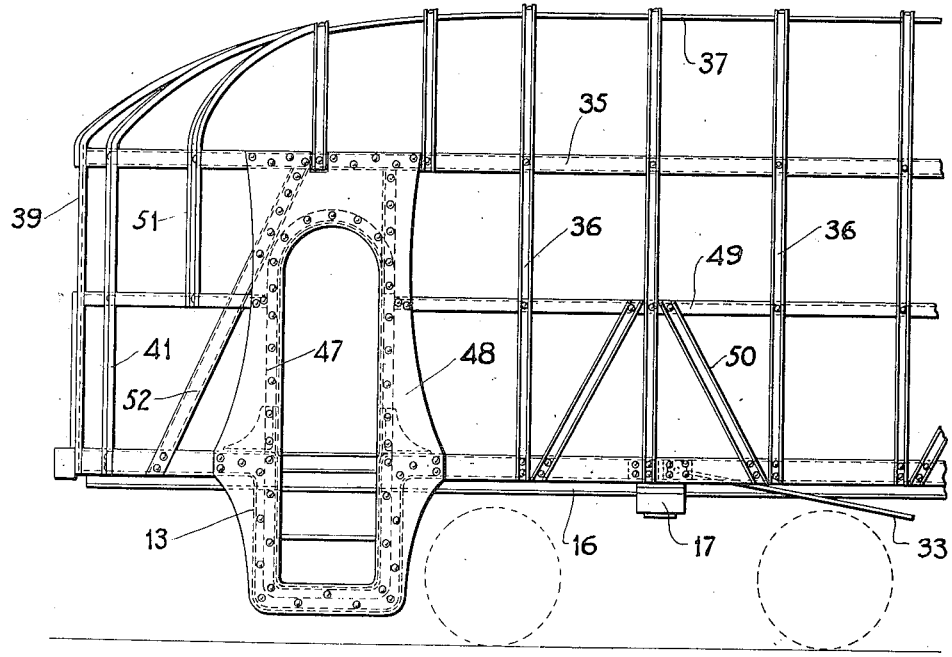
Figure 6:
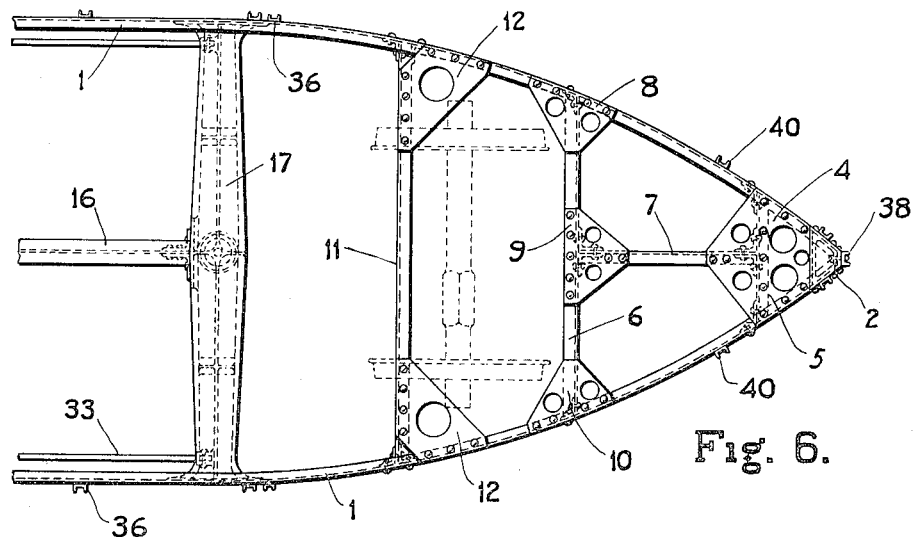
Figure 5:
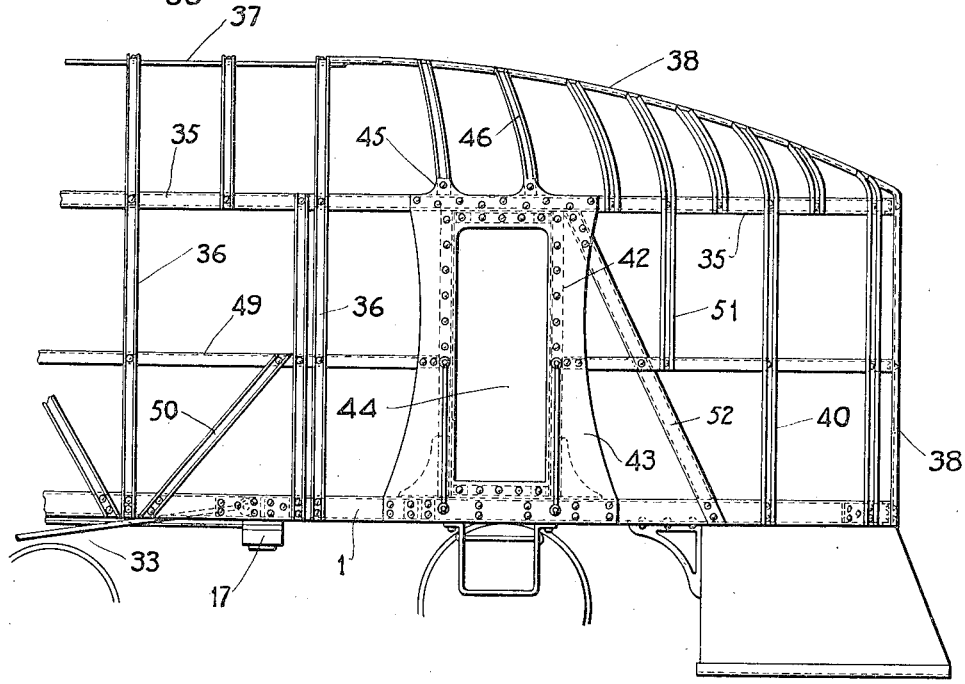
Figure 7:
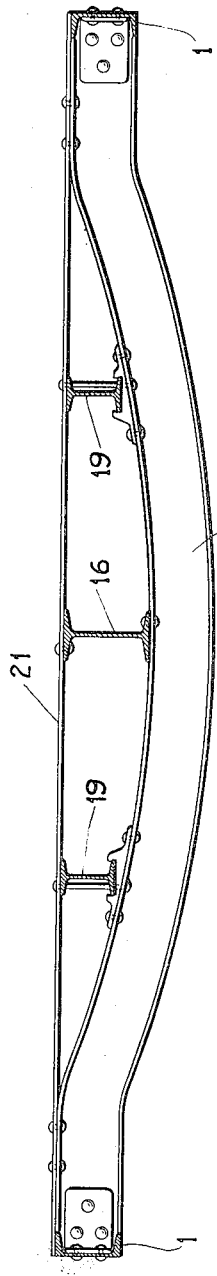
Figure 8:
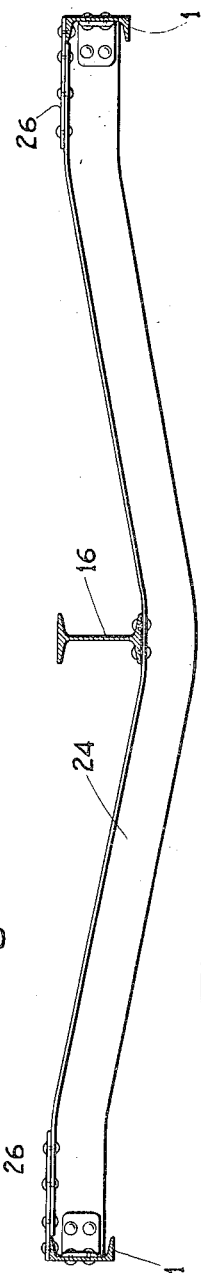
Figure 9:
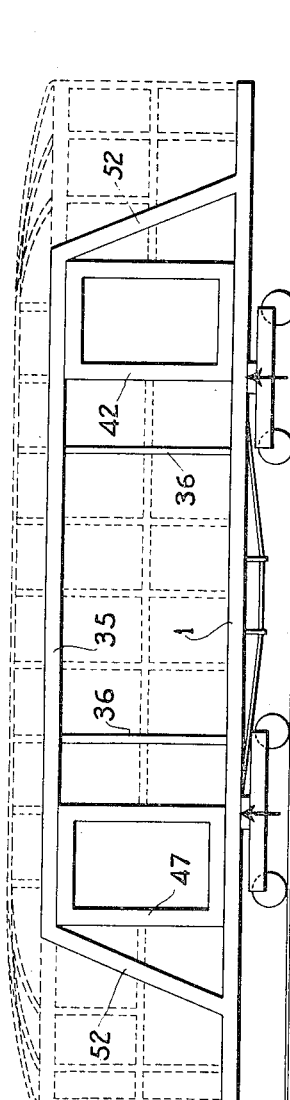

In the accompanying drawings, wherein is shown one of various possible embodiments of my invention,—Figure 1 is a side elevation thereof. Fig. 2 is a plan of the floor frame of the same. Fig. 3 is a side elevation of the rear portion of the frame. Fig. 4 is a plan of the lower portion thereof. Fig. 5 is a side elevation of the forward portion of the frame. Fig. 6 is a plan of the lower portion thereof. Fig. 7 is a cross section taken along the line $x$—$x$ of Fig. 2 showing the same upon an enlarged scale. Fig. 8 is a similar view taken along the line $y$—$y$ of Fig. 2. Fig. 9 is a diagrammatic view showing the relation of certain portions of the frame to each other and to the points of support.

Similar reference characters refer to similar parts throughout the several views.

As tending to render better understood certain of the several features of my invention, it may here be noted that as cars are moved, in general, either through the couplings or, in the case of self-propelled rolling stock, through the trucks, the greatest normal stresses are transmitted to the lower portion of the frame. Moreover, most of the shocks and jars to which the frame is subjected from any source are transmitted thereto at the lower portion thereof. For the above and other reasons, there is a tendency, on account of the inertia of the upper portion of the frame, to wrench and gradually loosen the component members thereof. Also, the floor frame, if strong and rigid enough to transmit the above stresses and efficiently support the superstructure imposed thereon, is likely to be of heavy construction. Another feature of interest, at this point, lies in the fact that I have found that, with car frames of ordinary construction, the effect of wind pressure thereon is to cause a lessened tractive power; on account of its tendency to lift portions of the car, and the air resistance results in a considerable waste of power. It may also be noted that I have found that with car frames of common construction there is a tendency of the parts thereof to sag with reference to the points of support and to spring out of proper alinement. The above and other defects are eliminated and many positive advantages attained in constructions of the nature of that hereinafter described.

Referring now to Fig. 1 of the drawings, there is shown a heavy channel-iron sill 1 which preferably extends entirely about the frame of the car. Sill 1 is inclined on both sides toward the forward end of the frame, as shown in Fig. 2, and is preferably bent as at 2, thus forming a point or edge which results in reducing the air resistance and other advantageous features. About the rear of the car the sill is curved, as shown at 3, for a purpose hereinafter described.

As shown in Fig. 6 of the drawings, there is stretched between the opposite sides of the sill 1 adjacent the point or bend 2 a web or plate 4 which, together with a cross member 5 positioned below and secured to the same, strengthens this portion of the floor frame and forms a substantially solid tip thereon. A second cross member 6 is stretched between the "side sills," as the portions of member 1 upon opposite sides of the frame may be termed, and this cross member is connected with the cross bar 5 by a longitudinal brace 7, the joints between these members being stiffened by suitable gussets 8, 9 and 10, as shown in the drawings. To the rear of cross brace or bar 6 is a third cross bar 11 which adds to the rigidity of the frame at this point, this member being connected with the sill 1 by suitable webbing or gussets 12.

Main or belt sill 1 which is curved about the rear end of the frame, as above described, is provided with depressed portions 13 upon the opposite sides thereof for a purpose hereinafter described. Adjacent these depressed portions there are stretched across the frame from side to side thereof depressed cross braces 14 and 15, upon which rests a heavy central, longitudinal sill 16 which is connected with the bolsters 17 and 18 and passes through the latter and terminates within the curved portion 3 of the belt sill 1. Additional longitudinal sills 19 are stretched between the bolster 18 and the portion 3 of belt sill, as shown in the drawings, these parts likewise resting upon the cross braces 14 and 15. The rigidity of the rear portion of the frame is further insured by heavy gusset plates 20 and 21, stretched between the side sills at either side of the depressed portions 13, and the inclined braces 22 extending from the rear supporting sills 19 to one of these plates. An additional plate 23 is also secured across the rear curved portion 3 of the belt sill, adding rigidity to the frame at this point.

The central longitudinal sill 16 rests upon depressed cross braces 24 and 25, resting within the inturned flanges of the side sills and secured thereto by suitable gussets 26. Additional cross members 27 are likewise stretched from sill 16 to the side sills and are held in place at their inner ends by means of a gusset plate 28 to which are likewise fastened diagonal braces 29 radiating from this plate to each of the four gussets 26. This floor construction is further stiffened by depressed needle beams 30 secured within the flanges of the side sills and engaging and supporting the diagonal braces 29 and longitudinal sill 16. The several cross and longitudinal sills, as well as the bolsters, are preferably secured within the inturned flanges of the belt sill so as to avoid any chance of weakness at their connections therewith.

The bolsters 17 and 18 are respectively supported upon trucks 31 and 32 which, in so far as this invention is concerned, may be of any desired construction, the former preferably supporting the source of power from which the car is propelled.

A truss rod 33 is stretched beneath each side sill, being spaced therefrom by suitable posts 34, so as to enhance the stiffness of these members in opposing stresses in a vertical plane.

Referring now to the superstructure which is built in with, rather than merely mounted upon, this floor frame, the same is formed about an upper side plate 35, preferably formed of heavy channel-iron, as indicated in the drawings, and is mounted upon the sill 1 by means of a number of transverse ribs 36 connected thereto at each side thereof and arched over the frame of the car. The upper curved portions of these ribs are held in properly spaced relation by a plate 37, the forward end of which is connected with a longitudinal roof rib 38, which is curved down to the forward apex of the side plate 35, the latter having a conformation similar to that of sill 1, and thence extends downwardly to the point 2 of the sill. A number of arched, inclined roof ribs are stretched between the forward portion of side plate 35 and the rib 38, as shown most clearly in Fig. 5 of the drawings.

At the rear of the car a longitudinal rib 39 is secured to the rear end of plate 37 and passes thence over side plate 35 to the rear of the curved portion of the sill 1. Additional ribs 40 and 41 are provided, which are stretched between the longitudinal ribs 38 and 39 and the belt sill.

Interposed between the upper side plate 35 and the sill 1 in the forward portion of the frame are rigid, rectangular frames 42, each of which rests flatly against and is secured to the side plate and the sill at its upper and lower ends respectively. These frames, although adapted for use as door frames, nevertheless perform another important function, which will be hereinafter described in detail. Without frames 42 are stretched heavy plates or sheets 43 having therein openings 44, registering with the frames. Plates 43 are rigidly secured to the frames 42 and to the upper side plates and side sills of the car and are provided at their upper end with projections 45, to which are secured inclined roof ribs 46. In this manner a rigid frame rests flatly against and is secured to the heavy upper side plate and the sill which form, respectively, the main supporting members or, in effect, backbones, of the upper and lower portions of the framework, and any relative longitudinal movement of these parts can take place only by shearing off the connections or rocking or collapsing these rigid frames. The shearing, on account of the length of the contacting surfaces, is out of the question, and as the connecting frames are of heavy metal and, preferably, integral formation, the chance of collapse is equally remote. Rocking of the frame, which is the only remaining method whereby the above relative movement may take place, is absolutely prevented by the rigid connections tying the upper side plate down to the sill.

At the rear of the car the sill 1 is dropped or depressed, as above described, upon each side of the frame. As the parts upon both sides are identical, however, that upon one side only will be described. Within the dropped portion 13 is fitted a rigid, metallic frame 47 and secured thereto and to upper side plate 35 and sill 1 is a heavy sheet or plate 48, provided with an opening registering with the frame.

Extended substantially about the entire frame is an intermediate side plate 49, the same being interrupted at the above-described door frames and being secured at either side of each of said doors to the corresponding plates 43 and 48, as shown in the drawings. Stretched between this intermediate side plate and the sill 1 are inclined braces 50, any desired number of which may be provided. There are also provided at each end of the car roof ribs 51 which extend from the side plate 49 over the upper side plate 35 and are thence arched toward the center of the car. Heavy inclined braces 52 are also provided between the plates 43 and 48 and the adjacent portions of the sill 1, the same taking against side plate 35 and being inclined therefrom toward the adjacent ends of the car. It will thus be seen that aside from the above described action of the interposed frames, any relative longitudinal strain of the upper portion of the car, such as is occasioned in cars of ordinary construction due to the longitudinal shocks applied to the floor frame and the inertia of the superstructure, is positively prevented, as such movement would bring direct compression or tension upon the inclined braces 52 and a lateral edgewise bending of the heavy sheets 43 and 48, which stresses the parts in question are so well adapted to resist as to bear the same without appreciable distortion.

It will be seen by reference to Fig. 9 of the drawings, that the entire frame forms in effect a bridge truss, the points of support being so disposed with relation thereto as to prevent any tendency of the structure to sag either at the center or the ends thereof. The belt sill and the upper side plate form in effect the upper and lower chords of the truss with respect to which the heavy door frames, positioned substantially over the points of support, with associated parts, act as struts, and the inclined braces 52 serve to tie the upper and lower chords one to another and act either as compression or tension members. This truss, moreover, not only serves as a rigid bridge between the points of support, and to prevent any chance of sagging at the ends, but also by reason of the inclined disposition of the several braces 50 and 52, acts in conjunction with the above described interposed angular frames, not only to support the ends and complete the above mentioned truss, but to take up any thrust brought to bear thereon, due to inertia of the upper portion of the frame.

Another feature of marked importance in the practical use of this car lies in its formation, whereby no purchase is afforded to wind pressure so as to enable the same to tend to lift the car and thus decrease its tractive power. No exposed hood is provided at the ends of the car beneath which the wind can take effect, and no deck plate or other break in the general smooth, rounded contour obtains. On the contrary, however, the entire outer surface is so formed as to utilize the wind pressure in driving the car toward the track. The roof is so curved as to cause the vertical components of the force exerted thereon by the wind to press the car downwardly, and this, especially in the case of the light construction shown, is of marked value.

It will thus be seen that I have provided a structure which accomplishes the several objects of my invention and in which the advantages hereinbefore mentioned are, among others, inherent to a marked degree. It will also be seen that not only is any tendency of the wind to lift the car, which in the case of light rolling stock is an important factor, done away with, but, by reason of the peculiar shape, this ordinarily harmful feature is turned to good account and the car pressed yet more firmly upon the rails. The air resistance to the propulsion is, moreover, reduced, owing to the general spheroidal shape of the rear end of the frame thereof, which does away with the chance of the formation of a partial vacuum in the rear of the car, and the disposition of the side frames, which form, in effect, a prow for the same. The entire frame is compact and simple and each member thereof is so positioned and proportioned as to perform its functions most efficiently and to coact with the others in such manner as to form a rigid structure which shall act as a unit under all conditions of use.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention, which as a matter of language, might be said to fall therebetween:

Certain features herein shown and described are shown described and claimed in my co-pending application, Serial No. 292,447, filed December 19, 1905, and are, accordingly, not claimed herein.

Having described my invention, what I claim as new and desire to secure by Letters Patent is:—

1. In a car frame, in combination, a sill, an upper side plate and an intermediate side plate extending about one end of the frame, a longitudinal rib secured to said sill at the front of said frame and extending upwardly adjacent said side plates and thence rearwardly, and a plurality of ribs connected with said sill and extending upwardly adjacent said side plates and secured to said first-mentioned rib.

2. In a car frame, in combination, a sill and an upper side plate extending about one end of the frame, a longitudinal rib secured to said sill at the front of said frame and extending upwardly adjacent said side plate and thence rearwardly, a plurality of ribs connected with said sill and extending upwardly adjacent said side plate and secured to said first-mentioned rib, and a brace secured to said sill and said side plate, said brace being inclined with respect to said sill.

3. In a car frame, in combination, a sill, an upper side plate and an intermediate side plate extending about the end of said frame, a cross member secured to said sill at two points and extending upwardly from one of said points thence across said frame and downwardly to the other of said points, a longitudinal rib attached to the front of said sill and extending upwardly adjacent said plates, and thence rearwardly to said cross member, and ribs secured to said side plates and to said sill and extending from said upper side plate to said longitudinal rib.

4. In a car frame, in combination, a sill extending about one end thereof, a pair of cross members stretched directly between opposite sides of said sill adjacent said end, and a longitudinal member connecting said cross members.

5. In a car frame, in combination, a continuous sill extending substantially to a point at the end of the frame, a cross member stretched directly between opposite sides of said sill adjacent said point, a second cross member at the rear of said first-mentioned cross member, a longitudinal member connecting said cross members, and a plate connecting the opposite sides of said sill adjacent said point and connected with said first-mentioned cross member.

6. In a car frame, in combination, a sill extending substantially to a point at the end of the frame, a cross member stretched directly between opposite sides of said sill adjacent said point, a second cross member at the rear of said first-mentioned cross member, a longitudinal member connecting said cross members, and a plate connecting the opposite sides of said sill adjacent said point and connected with said first-mentioned cross member.

7. In a car frame, in combination, a sill extending about one end of said frame, a pair of cross members connecting opposite sides of said sill, a longitudinal member stretched directly between said cross members, a third cross member rearwardly of said first-mentioned cross members, a plate connecting opposite sides of said sill adjacent the end of the frame and connected with one of said first-mentioned cross members, and plates connecting the remaining cross members to the adjacent portions of said sill.

8. In a car frame, in combination, a continuous sill, a continuous upper side plate, an intermediate side plate, a rigid metallic frame interposed between portions of said intermediate side plate and secured thereto and to said upper side plate and said sill and tension members connecting said sill and said upper side plate and tending to prevent movement of the same away from one another.

9. In a car frame, in combination, a sill, an upper side plate, an intermediate side plate, a door frame interposed between portions of said intermediate side plate and secured thereto and to said upper side plate and said sill, a longitudinal rib secured to said sill and extending upwardly adjacent said side plates and thence rearwardly, a plurality of ribs connecting said upper side plate with said longitudinal rib, a plate having an opening registering with said door frame, said plate being secured to said side plates and to said sill, and projections formed upon said plate secured to said last-mentioned ribs.

10. In a car frame, in combination, a sill extending about one end of said frame, upper and intermediate side plates extending about said end, a longitudinal rib secured to said sill at the end of said frame and passing upwardly adjacent said side plates and thence rearwardly, ribs connecting said side plates and said sill with said rearwardly extending portion of said first-mentioned rib, a pair of cross members stretched directly between opposite sides of said sill, and a longitudinal member connecting said cross members.

11. In a car frame, in combination, a sill extending about one end of said frame, upper and intermediate side plates extending about said end, a longitudinal rib secured to said sill at the end of said frame and passing upwardly adjacent said side plates and thence rearwardly, ribs connecting said side plates and said sill with said rearwardly extending portion of said first-mentioned rib, a pair of cross members stretched directly between opposite sides of said sill, a longitudinal member connecting said cross members, and a continuous cross member secured to opposite sides of said sill and extending upwardly therefrom and across the car.

12. In a car frame, in combination, a sill curved about one end of said frame, an upper side plate curved about said end, a longitudinal rib secured to said sill at the end of said frame and passing upwardly adjacent said side plate and said sill with said rearwardly extending portion of said first-mentioned rib, a pair of cross members stretched directly between opposite sides of said sill, a longitudinal member connecting said cross members, a continuous cross member secured to opposite sides of said sill and extending upwardly therefrom and across the car, and a member secured to said sill and extending obliquely to said upper side plate.

13. In a car frame, in combination, a sill curved about one end of said frame, upper and intermediate side plates curved about said end, a longitudinal rib secured to said sill at the end of said frame and passing upwardly adjacent said side plates and thence rearwardly, ribs connecting said plates and said sill with said rearwardly extending portion of said first-mentioned rib, a pair of cross members stretched directly between opposite sides of said sill, a longitudinal member connecting said cross members, a continuous cross member secured to opposite sides of said sill and extending upwardly therefrom and across the car, a member secured to said sill and extending obliquely to said upper side plate, and a rigid angular frame interposed between portions of said intermediate side plate and secured thereto and to said upper side plate and said sill.

14. In a car frame, in combination, a sill extending about one end thereof, said sill being provided with portions depressed below the main portion thereof at each side of the frame and said depressed portions being substantially opposite one another, and cross members stretched directly between opposite sides of said sill at each side of said depressed portions.

15. In a car frame, in combination, a sill extending about the lower portion thereof, longitudinal sills within said first-mentioned sill, a cross member secured to said longitudinal sills and said first-mentioned sill, a second cross-member upon which said longitudinal sills terminate, and inclined braces extending from said longitudinal sills to said first cross member.

16. In a car frame, in combination, a sill extending about one end thereof, said sill being provided with portions depressed below the main portion thereof at each side of the frame and said depressed portions being substantially opposite one another, cross members stretched directly between opposite sides of said sill at each side of said depressed portions, longitudinal sills within said first-mentioned sill, and inclined braces connecting said longitudinal sills with one of said cross members.

17. In a car frame, in combination, a sill extending about the lower portion thereof, an upper side plate extending about the upper portion thereof, an intermediate side plate about said frame, cross members secured to said sill at two points, said cross members extending upwardly from each of said points adjacent said side plates, thence across the frame and downwardly to the other of said points, and braces secured to said sill and inclined upwardly therefrom to each of said side plates.

18. In a car frame, in combination, a sill extending entirely about the lower portion thereof, an upper side plate extending entirely about the upper portion thereof, an intermediate side plate about said frame, cross members secured to said sill at two points, said cross members extending upwardly from each of said points, adjacent said side plates, thence across the frame and downwardly to the other of said points, and braces secured to said sill and inclined upwardly therefrom to said side plates.

19. In a car frame, in combination, a sill extending about the lower portion thereof, an upper side plate extending about the upper portion thereof, braces secured to said sill and inclined upwardly therefrom to said side plate, longitudinal ribs secured to said sill at the ends thereof and extending upwardly adjacent said side plate and thence toward the center of the frame, and inclined ribs connecting said longtiudinal ribs with said side plate.

20. In a car frame, in combination, a sill extending about the lower portion thereof, an upper side plate extending about the upper portion of said frame, continuous cross members secured to said sill at two points, said cross members extending upwardly at each of said points adjacent said side plates, thence across the frame and downwardly to the other of said points, braces secured to said sill and inclined upwardly therefrom to said side plate, longitudinal ribs secured to said sill at the ends thereof and extending upwardly adjacent said side plate and thence toward the center of the frame, inclined ribs connecting said longtiudinal ribs with said side plate, a plurality of cross members stretched directly between opposite sides of said sill at each end thereof, and longitudinal members connecting said cross members at each end.

21. In a car frame, in combination, a sill extending about the lower portion thereof, an upper side plate extending about the upper portion of said frame, braces secured to said sill and inclined upwardly therefrom to said side plate, longitudinal ribs secured to said sill at the ends thereof and extending upwardly adjacent said side plate and thence toward the center of the frame, inclined ribs connecting said longitudinal ribs with said side plate, a plurality of cross members stretched directly between opposite sides of said sill at each end thereof, and longitudinal members connecting said cross members at each end.

22. In a car frame, in combination, a sill extending about the lower portion thereof and having portions upon each side thereof depressed below the main portion thereof, said depressed portions being substantially opposite, cross members stretched directly between opposite sides of said sill at each side of said depressed portions, and door frames secured within said depressed portions.

23. In a car frame, in combination, a sill extending about the lower portion thereof and having portions upon each side thereof depressed below the main portion thereof, said depressed portions being substantially opposite, cross members connecting opposite sides of said sill at each side of said depressed portions, an upper side plate extending about the upper portion of said frame, and rigid frames secured within said depressed portions and rigidly secured to said upper side plate.

24. In a car frame, in combination, a sill extending about the lower portion thereof and having portions upon each side thereof depressed below the main portion thereof, an upper side plate extending about the upper portion of said frame, and rigid frames having their sides fitted within said depressed portions and rigidly secured to said upper side plate.

25. In a car frame, in combination, a sill extending about the lower portion thereof and having a portion depressed below the main portion thereof, an upper side plate extending about the upper portion of said frame, a door frame fitted within said depressed portion and secured to said upper side plate, a plurality of continuous cross members each secured to said sill at two points, each of said cross members extending upwardly from each of said points adjacent said upper side plate, thence across the frame and downwardly to the other of said points, longitudinal ribs secured to said sill at the ends of said frame and extending upwardly adjacent said upper side plate and thence toward the center of the car, and inclined ribs connecting said upper side plate with said longitudinal ribs.

26. In a car frame, in combination, a sill, an upper side plate, a rigid angular one-piece frame interposed between and secured to said side plate and said sill, and means connecting said sill and said side plate and adapted to prevent them from moving apart.

27. In a car frame, in combination, a pair of longitudinal members, a complete rigid metallic frame interposed between and resting against both of said members, and tension members connecting said longitudinal members and adapted to prevent them from moving apart.

28. In a car frame, in combination, a sill, an upper side plate, a complete rigid rectangular metallic frame interposed between and secured to said side plate and said sill, and means connecting said sill and said side plate adapted to prevent them from moving apart.

29. In a car frame, in combination, a sill, an upper side plate, a complete rigid rectangular metallic frame interposed between and secured to said side plate and said sill, the upper and lower portions of said frame resting between said sill and said side plate in substantially parallel relation thereto and being secured thereto, and means connecting said sill and said side plate adapted to prevent them from moving apart.

30. In a car frame, in combination, side sills, a longitudinal sill positioned between said side sills, a depressed cross member stretched between and abutting against said side sills and supporting said longitudinal sill, and means stretched between said side sills over said cross member and supported upon said longitudinal sill.

31. In a car frame, in combination, side sills, a longitudinal sill positioned therebetween, a pair of cross members connecting said side sills and passing beneath and supporting said longitudinal sill, and diagonal members stretched between said longitudinal sill and said side sills.

32. In a car frame, in combination, side sills, a longitudinal sill positioned therebetween, a pair of cross members connecting said side sills and passing beneath and supporting said longitudinal sill, and diagonal members stretched between said longitudinal sill and said side sills adjacent said cross members.

33. In a car frame, in combination, side sills, a longitudinal sill positioned between the same, and a plurality of diagonal members extending from said longitudinal sill to said side sills.

34. In a car frame, in combination, side sills, diagonal members connecting said side sills one with another, and cross members stretched between said side sills and passing beneath and supporting said diagonal members.

35. In a car frame, in combination, side sills, a longitudinal sill positioned between the same, diagonal members extending from said longitudinal sill to said side sills, and cross members stretched between said side sills and passing beneath and supporting said diagonal members and said longitudinal sill.

36. In a car frame, in combination, side sills, cross members connecting said side sills, diagonal members connecting said side sills at points adjacent said cross members, and cross members connecting said side sills and passing beneath and supporting said diagonal members.

37. In a car frame, in combination, side sills, cross members connecting said side sills, diagonal members connecting said side sills at points adjacent said cross members, cross members connecting said side sills and passing beneath and supporting said diagonal members, and a longitudinal sill interposed between said side sills connected with said diagonal members and resting upon said cross members.

38. In a car frame, in combination, side sills, a longitudinal sill interposed therebetween, an auxiliary longitudinal sill positioned between said first-mentioned longitudinal sill and each of said side sills, and a depressed cross member stretched between said side sills and passing beneath and supporting said longitudinal sills.

39. In a car frame, in combination, side sills, a longitudinal sill positioned therebetween, a bolster, auxiliary longitudinal sills stretched between said bolster and the end of the frame, and a depressed cross member connecting said side sills and passing beneath and supporting said longitudinal sills.

40. In a car frame, in combination, a sill curved about one end thereof, a bolster stretched between the opposite sides of said sill, longitudinal sills extending from said bolster to the curved portion of said first-mentioned sill, and a depressed cross member stretched between the opposite sides of said sill and passing beneath and supporting said longitudinal sills.

41. In a car frame, in combination, side sills, a plurality of longitudinal sills positioned therebetween, a transverse gusset plate extending across the frame and secured to said side and said longitudinal sills, and a depressed cross member stretched between said side sills beneath said transverse gusset plate and passing beneath and supporting said longitudinal sills.

42. In a car frame, in combination, side sills, front and rear bolsters stretched between said side sills, a longitudinal sill positioned between said side sills and passing from the front bolster to the rear end of the frame, auxiliary longitudinal sills passing from the rear bolster to the rear end of the frame, a cross member stretched between said side sills and passing beneath and supporting said longitudinal sills, and diagonal members stretched between said longitudinal sill and said side sills.

43. In a car frame, in combination, side sills, front and rear bolsters stretched between said side sills, a longitudinal sill positioned between said side sills and passing from the front bolster to the rear end of the frame, auxiliary longitudinal sills passing from the rear bolster to the rear end of the frame, a cross member stretched between said side sills and passing beneath and supporting said longitudinal sills, diagonal members stretched between said longitudinal sill and said side sills, and cross members stretched between said side sills adjacent said diagonal members and passing beneath and supporting said first-mentioned longitudinal sill.

44. In a car frame, in combination, side sills, front and rear bolsters stretched between said side sills, a longitudinal sill positioned between said side sills and passing from the front bolster to the rear end of the frame, auxiliary longitudinal sills passing from the rear bolster to the rear end of the frame, a cross member stretched between said side sills and passing beneath and supporting said longitudinal sills, diagonal members stretched between said first longitudinal sill and said side sills, and cross members stretched between said side sills and passing beneath and supporting said diagonal members and said first-mentioned longitudinal sill.

45. In a car frame, in combination, side sills, front and rear bolsters stretched between said side sills, a longitudinal sill positioned between said side sills and passing from the front bolster to the rear end of the frame, auxiliary longitudinal sills passing from the rear bolster to the rear end of the frame, a cross member stretched between said side sills and passing beneath and supporting said longitudinal sills, diagonal members stretched between said first longitudinal sill and said side sills, and a transverse gusset plate stretched between said side sills and secured to said longitudinal sills.

46. In a car frame, in combination, side sills, longitudinal sills positioned therebetween, a transverse gusset plate stretched between said side sills and secured to said longitudinal sills, and inclined braces abutting against and secured to said longitudinal sills and extending therefrom to said gusset plate.

47. In a car frame, in combination, side sills, longitudinal sills positioned therebetween, a transverse gusset plate stretched between said side sills and secured to said longitudinal sills, inclined braces extending from said longitudinal sills to said gusset plate, and a depressed cross member stretched between said side sills and passing beneath and supporting said longitudinal sills.

48. In a car frame, in combination, converging sills meeting substantially at a point, a cross member stretched between said side sills, and longitudinally disposed means connecting said cross member with said point.

49. In a car frame, in combination, side sills curving one toward another and connected one with another to form a floor frame substantially pointed at the forward end, a cross member stretched between and secured to said side sills, and bracing means lying substantially in the plane of said side sills and extending from a point adjacent said forward end rearwardly to said cross member and secured thereto.

50. In a car frame, in combination, side sills converging substantially to a point at one end of the frame, a plate secured within said sills at said point, a cross member connecting opposite portions of said sills, and a longitudinal member connecting said plate with said cross member.

51. In a car frame, in combination, a sill converging substantially to a point at one end of the frame, a side plate positioned above said sill and of similar shape thereto, upright members connecting said sill and said side plate, a central member extending toward the center of the car from said side plate, and members connecting said side plate with said central member.

52. In a car frame, in combination, a side sill, an upper side plate, rigid frames interposed between said side sill and said upper side plate, and inclined tension members extending from said upper side plate adjacent each of said frames to said sill, said members being inclined downwardly toward the ends of the car frame.

53. In a car frame, in combination, a side sill, an upper side plate, rigid frames interposed between said side sill and said upper side plate, inclined members extending from said upper side plate adjacent each of said frames to said sill, said members being inclined downwardly toward the adjacent ends of the car frame, and supporting bolsters positioned beneath said frames and supporting said sill at points toward the center of the car frame from said inclined members.

54. In a car frame, in combination, a side sill, an upper side plate, rigid frames interposed between said side sill and said upper side plate, inclined members extending from said upper side plate adjacent each of said frames to said sill, said members being inclined downwardly toward the ends of the car frame, and supporting bolsters positioned beneath said frames and supporting said sill at points toward the center of the car frame from said inclined members and adjacent said frames.

55. In a car frame, in combination, a side sill, an upper side plate, rigid frames interposed between said side sill and said upper side plate, inclined members extending from said upper side plate adjacent each of said frames to said sill, said members being inclined downwardly toward the ends of the frames, supporting bolsters positioned beneath said frames and supporting said sill at points toward the center of the car frame from said inclined members and adjacent said frames, and arched roof ribs connected with said upper side plate.

56. In a car frame, in combination, a side sill, supporting bolsters positioned adjacent said sill, truss rods connected with said bolsters adjacent said sill and spaced from and supporting said sill, an upper side plate, rigid frames interposed between said sill and said upper side plate adjacent each of said supporting bolsters, and inclined members connecting said upper side plate with said sill upon the sides of said frames toward the ends of the car, said inclined members being inclined downwardly toward the adjacent ends of the car.

57. In a car frame, in combination, side sills curving one toward another and connected one with another to form a floor frame substantially pointed at the forward end, a cross member stretched between and secured to said side sills, and bracing means lying substantially in the plane of said side sills and extending from the apex of said pointed end rearwardly to said cross member and secured thereto.

58. In a car frame, in combination, side sills curving one toward another and connected one with another to form a floor frame substantially pointed at the forward end, a cross member stretched between and secured to said side sills, and bracing means lying substantially in the plane of said side sills and extending from a point adjacent said forward end rearwardly to said cross member and abutting against said cross member and said side sills at said forward end.

59. In a car frame, in combination, side sills curving one toward another and connected one with another to form a floor frame substantially pointed at the forward end, a cross member stretched between and secured to said side sills, and bracing means lying substantially in the plane of said side sills and extending from the apex of said pointed end rearwardly to said cross member and secured thereto, said bracing means being positioned to abut against said member and said side sills at said apex.

60. In a car frame, in combination, side sills curving one toward another and connected one with another to form a floor frame substantially pointed at the forward end, a body bolster stretched between and abutting against said side sills, means forming an end sill at the rear end of the frame, and means secured to said bolster and extending to and connected with said end sill, whereby impact upon said forward end is transmitted through said last means to said rear end.

61. In a car frame, in combination, side sills curving one toward another and connected one with another to form a floor frame substantially pointed at the forward end, bracing means secured to said side sills at said forward end and lying substantially in the plane thereof and extending rearwardly therefrom, a body bolster stretched between and abutting against said side sills, means forming an end sill at the rear end of the frame, and means secured to said bolster and extending to and connected with said end sill.

62. In a car frame, in combination, side sills curving one toward another and connected one with another to form a floor frame substantially pointed at the forward end, a cross member stretched between and secured to said side sills, bracing means lying substantially in the plane of said side sills and extending from a point adjacent said forward end rearwardly to said cross member and secured thereto, a body bolster stretched between and abutting against said side sills, means forming an end sill at the rear end of the frame, and means secured to said bolster and extending to and connected with said end sill.

63. In a car frame, in combination, side sills curving one toward another and connected one with another to form a floor frame substantially pointed at the forward end, a body bolster stretched between and abutting against said side sills, means forming an end sill at the rear end of the frame, means secured to said bolster and extending to and connected with said end sill whereby impact upon said forward end is transmitted through said last means to said rear end, and a second body bolster stretched between said side sills and secured thereto and to said last means at a point intermediate said first bolster and said end sill.

64. In a car frame, in combination, side sills curving toward and connected with one another at the end of the car, a cross member stretched between and secured to said sills, and bracing means lying substantially in the plane of said side sills and extending from said end to said cross member and secured thereto.

65. In a car frame, in combination, side sills curving toward and connected with one another at the end of the car, a cross member stretched between and secured to said sills, and a pair of substantially parallel longitudinal sills stretched between said end and said cross member and secured to both of the same and lying in the plane of said side sills.

66. In a car frame, in combination, side sills curving one toward another and connected one with another to form a floor frame substantially pointed at the forward end, a cross member stretched between and secured to said side sills, bracing means lying substantially in the plane of said side sills and extending from a point adjacent said forward end rearwardly to said cross member and secured thereto, a body bolster stretched between and abutting against said side sills, means forming an end sill at the rear end of the frame, means secured to said bolster and extending to and connected with said end sill, diagonal bracing means stretched between said side sills and intersecting one with another, and cross member connecting said side sills at points adjacent the ends of said diagonal bracing means.

67. In a car frame, in combination, side sills curving toward and connected with one another at the end of the car, a cross member stretched between and secured to said side sills, a pair of substantially parallel longitudinal sills stretched between said end and said cross member and secured to both of the same and lying in the plane of said side sills, and a pair of braces respectively secured to said longitudinal sills and inclined outwardly toward and connected with said side sills.

68. In a car frame, in combination, a pair of side sills curving toward and connected with one another to form a rounded end to the car, a cross member, a pair of longitudinal sills lying substantially in the plane of said side sills and connected with the same at said curved end and connected with said cross member, and a pair of braces respectively connected with said longitudinal sills adjacent said cross member and respectively inclined outwardly toward and connected with said side sills.

69. In a car frame, in combination, side sills curving one toward another and connected one with another to form a floor frame substantially pointed at the forward end, bracing means secured to said side sills at said forward end and lying substantially in the plane thereof and extending rearwardly therefrom, a body bolster stretched between and abutting against said side sills, means forming an end sill at the rear end of the frame, means secured to said bolster and extending to and connected with said end sill, and a pair of diagonal bracing members stretched between and secured to said side sills and intersecting one with another substantially midway therebetween.

70. In a car frame, in combination, side sills curving one toward another and connected one with another to form a floor frame substantially pointed at the forward end, a cross member stretched between and secured to said side sills, bracing means lying substantially in the plane of said side sills and extending from a point adjacent said forward end rearwardly to said cross member and secured thereto, and a pair of diagonal bracing members stretched between and secured to said side sills and intersecting one with another substantially midway therebetween.

71. In a car frame, in combination, side sills curving one toward another and connected one with another to form a floor frame substantially pointed at the forward end, a cross member stretched between and secured to said side sills, bracing means lying substantially in the plane of said side sills and extending from a point adjacent said forward end rearwardly to said cross member and abutting against said cross member and said side sills at said forward end, and a pair of diagonal bracing members stretched between and secured to said side sills and intersecting one with another substantially midway therebetween.

72. In a car frame, in combination, side sills curving one toward another and connected one with another to form a floor frame substantially pointed at the forward end, a body bolster stretched between and abutting against said side sills, means forming an end sill at the rear end of the frame, means secured to said bolster and extending to and connected with said end sill, whereby impact upon said forward end is transmitted through said last means to said rear end, and a pair of diagonal bracing members stretched between and secured to said side sills and intersecting one with another substantially midway therebetween.

73. In a car frame, in combination, side sills curving toward and connected with one another at the end of the car, a cross member stretched between and secured to said sills, bracing means lying substantially in the plane of said side sills and extending from said end to said cross member and secured thereto, and a pair of diagonal bracing members stretched between and secured to said side sills and intersecting one with another substantially midway therebetween.

74. In a car frame, in combination, side sills curving toward and connected with one another at the end of the car, a cross member stretched between and secured to said sills, a pair of substantially parallel longitudinal sills stretched between said end and said cross member and secured to both of the same and lying in the plane of said side sills, and a pair of diagonal bracing members stretched between and secured to said side sills and intersecting one with another substantially midway therebetween.

75. In a car frame, in combination, side sills curving toward and connected with one another at the end of the car, a cross member stretched between and secured to said side sills, a pair of substantially parallel longitudinal sills stretched between said end and said cross member and secured to both of the same and lying in the plane of said side sills, a pair of braces respectively secured to said longitudinal sills and inclined outwardly toward and connected with said side sills, and a pair of diagonal bracing members stretched between and secured to said side sills and intersecting one with another substantially midway therebetween.

76. In a car frame, in combination, side sills curving toward and connected with one another at the end of the car, a cross member stretched between and secured to said sills, and bracing means lying substantially in the plane of said side sills and extending from said end to said cross member and secured thereto, said side sills being formed of channel iron and said longitudinal sills being of I-cross section.

77. In a car frame, in combination, side sills curving toward and connected with one another at the end of the car, a cross member stretched between and secured to said side sills, a pair of substantially parallel longitudinal sills stretched between said end and said cross member and secured to both of the same and lying in the plane of said side sills, and a pair of braces respectively secured to said longitudinal sills and inclined outwardly toward and connected with said side sills, said side sills being formed of channel iron and said longitudinal sills being of I-cross section.

78. In a car frame, in combination, a pair of side sills curving toward and connected with one another to form a rounded end to the car, a cross member, a pair of longitudinal sills lying substantially in the plane of said side sills and connected with the same at said curved end and connected with said cross member, and a pair of braces respectively connected with said longitudinal sills adjacent said cross member and respectively inclined outwardly toward and connected with said side sills, said side sills being formed of channel iron and said longitudinal sills being of I-cross section.

79. In a car frame, in combination, side sills curving one toward another and connected one with another to form a floor frame substantially pointed at the forward end, bracing means secured to said side sills at said forward end and lying substantially in the plane thereof and extending rearwardly therefrom, a body bolster stretched between and abutting against said side sills, means forming an end sill at the rear end of the frame, means secured to said bolster and extending to and connected with said end sill, and a pair of diagonal bracing members stretched between and secured to said side sills and intersecting one with another substantially midway therebetween, said side sills being formed of channel iron and said longitudinal sills being of I-cross section.

80. In a car frame, in combination, side sills curving toward and connected with one another at the end of the car, a cross member stretched between and secured to said sills, bracing means lying substantially in the plane of said side sills and extending from said end to said cross member and secured thereto, and a pair of diagonal bracing members stretched between and secured to said side sills and intersecting one with another substantially midway therebetween, said side sills being formed of channel iron and said longitudinal sills being of I-cross section.

81. In car construction, in combination, an upper plate member shaped to form a substantially pointed front end and a rounded rear end, and roof framing mounted upon said plate shaped to provide a roof arched across from one side of the car to the other and inclined downwardly to said plate at each end of the car.

82. In a car frame, in combination, side sills, upper side plates corresponding to said side sills, intermediate side plates respectively disposed between said upper side plates and said side sills at each side of the car, and posts connected with said sills and extending upwardly and thence curved over to connect one with another and form a curved roof to the car, said side sills being connected one with another and shaped to form a pointed forward end and a rounded rear end to the frame, and said plates being formed to correspond in plan with said sills.

83. In car construction, in combination, an upper plate member shaped to form a substantially pointed front end and a rounded rear end, and roof framing mounted upon said plate shaped to provide a roof arched across from one side of the car to the other and inclined downwardly to said plate at the front end and inclined in a more abrupt curve to said plate at the rear end.

84. In car construction, in combination, an upper plate member shaped to form a substantially pointed front end and a rounded rear end, roof framing mounted upon said plate shaped to provide a roof arched across from one side of the car to the other and inclined downwardly to said plate at each end of the car, a sill registering in plan with said plate, uprights connecting said sill with said plate, a cross member connecting said sill across the car, and a longitudinal member substantially in the plane of said sill and secured to said cross member and to said sill substantially at its pointed forward end.

85. In car construction, in combination, an upper plate member shaped to form a substantially pointed front end and a rounded rear end, roof framing mounted upon said plate shaped to provide a roof arched across from one side of the car to the other and inclined downwardly to said plate at each end of the car, a sill registering in plan with said plate, uprights connecting said sill with said plate, a cross member connecting said sill across the car, a longitudinal member substantially in the plane of said sill and secured to said cross member and to said sill substantially at its pointed forward end, and inclined braces extending from said sill to the upper portion of the car framing.

86. In a car frame, in combination, side sills, upper side plates corresponding to said side sills, intermediate side plates respectively disposed between said upper side plates and said side sills at each side of the car, posts connected with said sills and extending upwardly and thence curved over to connect one with another and form a curved roof to the car, said side sill being provided with a portion depressed beneath the general level thereof, and a door frame fitted within said depressed portion and secured to said sill and said upper side plate.

87. In a car frame, in combination, side sills, upper side plates corresponding to said side sills, intermediate side plates respectively disposed between said upper side plates and said side sills at each side of the car, posts connected with said sills and extending upwardly and thence curved over to connect one with another and form a curved roof to the car, said side sills being curved toward and connected one with another to form a rounded end to the frame and said plates being shaped to correspond in plan with said sills, said side sill being provided with a portion depressed beneath the general level thereof, and a door frame fitted within said depressed portion and secured to said sill and said upper side plate.

88. In a car frame, in combination, side sills, upper side plates corresponding to said side sills, intermediate side plates respectively disposed between said upper side plates and said side sills at each side of the car, posts connected with said sills and extending upwardly and thence curved over to connect one with another and form a curved roof to the car, said side sills being curved toward and connected one with another to form a rounded end to the frame and said plates being shaped to correspond in plan with said sills, inclined braces extending from said sills to said plates, said side sill being provided with a portion depressed beneath the general level thereof, and a door frame fitted within said depressed portion and secured to said sill and said upper side plate.

89. In car construction, in combination, a car sill, a metallic door frame provided with an arched top mounted upon said sill, and an upper side plate mounted upon the top of said door frame.

90. In car construction, in combination, a car sill, a metallic door frame provided with an arched top mounted upon said sill, an upper side plate mounted upon the top of said door frame, and inclined braces extending from said sill to said plate upon opposite sides of said door frame and converging upwardly toward said frame.

91. In car construction, in combination, an upper side plate upon each side of the car, roof framing forming a roof rounded across the car from one side plate to the other, a car sill, uprights connecting said sill with said side plate, a door frame in the side of the car extending below the general level of the corresponding sill, and a metal sheet secured to the side of the car and extending downwardly adjacent the bottom of said door frame.

92. In a car frame, in combination, a side sill, a side plate, an upright member connected with said sill and said side plate and extending below said sill, bracing means connected with the lower end of said member and with said sill at a point offset from said member, a door frame interposed between said sill and said plate, and upwardly converging inclined braces interposed between said sill and said plate.

93. In a car frame, in combination, a side sill, a side plate, an upright member connected with said sill and said side plate and extending below said sill, bracing means connected with the lower end of said member and with said sill at a point offset from said member, a door frame interposed between said sill and said plate, upwardly converging inclined braces interposed between said sill and said plate, and horizontal members intermediate said sill and said plate connected with and bracing said door frame.

94. In a car frame, in combination, a side sill, a side plate, an upright member connected with said sill and said side plate and extending below said sill, bracing means connected with the lower end of said member and with said sill at a point offset from said member, a door frame interposed between said sill and said plate, and upwardly converging inclined braces interposed between said sill and said plate, said several members being formed of structural steel and secured one to another.

95. In a car frame, in combination, a side sill, a side plate, an upright member connected with said sill and said side plate and extending below said sill, bracing means connected with the lower end of said member and with said sill at a point offset from said member, a door frame interposed between said sill and said plate, upwardly converging inclined braces interposed between said sill and said plate, and a plurality of members secured to said sill and extending upwardly therefrom and arched over to form the roof of the car.

In testimony whereof I affix my signature, in the presence of two witnesses.

WILLIAM R. McKEEN, Jr.

Witnesses:
C. A. COONS,
H. P. VAN ARSDALE.